United States Patent [19]

Kapp et al.

[11] Patent Number: 5,085,903

[45] Date of Patent: Feb. 4, 1992

[54] COATINGS FOR THE PROTECTION OF PRODUCTS IN LIGHT-TRANSMITTING CONTAINERS

[75] Inventors: David C. Kapp; Russell E. Boston; Leland H. Carlblom, all of Gibsonia; Mildred L. McKinley, Pittsburgh; Jess A. Kozma, Verona, all of Pa.

[73] Assignee: PPG Industries, Inc., Pittsburgh, Pa.

[21] Appl. No.: 557,448

[22] Filed: Jun. 11, 1990

[51] Int. Cl.$^5$ ............................ B05D 5/00; B32B 27/06
[52] U.S. Cl. .................................... 428/34.6; 252/589; 427/160; 427/164; 427/165; 427/393.5; 427/389.7; 428/35.7; 428/417; 428/425.6; 428/426; 428/430; 428/441; 428/442; 428/480; 428/500; 428/524
[58] Field of Search ............... 427/160, 389.7, 164, 427/165, 393.5; 252/589; 428/34.6, 35.7, 417, 425.6, 430, 441, 442, 480, 500, 524, 426

[56] References Cited

U.S. PATENT DOCUMENTS

| | | | |
|---|---|---|---|
| 3,157,633 | 11/1964 | Kuhn | 564/270 |
| 3,350,204 | 10/1967 | Smith et al. | 96/28 |
| 3,519,462 | 7/1970 | Bristol et al. | 117/33 |
| 3,529,982 | 9/1970 | Luethi et al. | 427/160 |
| 3,859,117 | 1/1975 | Erchak et al. | 117/94 |
| 3,870,519 | 3/1975 | Piller | 427/160 |
| 3,937,853 | 2/1976 | Shank, Jr. | 427/29 |
| 4,000,148 | 12/1976 | Pond et al. | 427/160 |
| 4,053,076 | 10/1977 | Vogel et al. | 215/12 |
| 4,268,554 | 5/1981 | Gras | 428/35 |
| 4,319,016 | 3/1982 | Kurobe et al. | 427/160 |
| 4,320,174 | 3/1982 | Rabinovitch et al. | 428/518 |
| 4,389,421 | 6/1983 | Palamand | 426/330 |
| 4,409,266 | 10/1983 | Wieczorrek et al. | 427/302 |
| 4,557,730 | 12/1985 | Bennett et al. | 8/442 |
| 4,850,660 | 7/1989 | Jones et al. | 350/1.6 |
| 4,863,802 | 9/1989 | Moore et al. | 427/160 |
| 4,904,574 | 2/1990 | Suzuki | 430/372 |
| 4,904,578 | 2/1990 | Tanaka et al. | 430/507 |

FOREIGN PATENT DOCUMENTS 57-165466 10/1982 Japan .
61-209927 9/1986 Japan .

*Primary Examiner*—Janyce Bell
*Attorney, Agent, or Firm*—Dennis G. Millman; Godfried R. Akorli

[57] ABSTRACT

Disclosed herein is a combination of a film-former, a metal-free, reactive colorant, ultraviolet light absorber and an adhesion promoter in an effective combination to substantially block transmission of light through a container in order to reduce lightstruck phenomenon.

14 Claims, No Drawings

COATINGS FOR THE PROTECTION OF PRODUCTS IN LIGHT-TRANSMITTING CONTAINERS

BACKGROUND OF THE INVENTION

1. Field of the Invention

The present invention relates to coating compositions and processes for the protection of products in light-transmitting containers. More specifically, the present invention relates to the prevention of an occurance of a phenomenon referred to commonly as "lightstruck" or "sunstruck" which causes offensive flavor of certain substances, such as beer in glass bottles, upon exposure of the substances to harmful light.

2. Brief Description of the Prior Art

It has been known that beverages such as beer, ale and the like made from or containing fermented extracts of malt are not stable to light. It is believed that harmful light, particularly in the ultraviolet region, adversely affects the flavor of these beverages in transparent light-transmitting containers and thereby causes the lightstruck flavor. The common art-known method of preventing lightstruck flavor of these beverages entails making the containers brown or dark amber in color. These colored containers are believed to cut out most of the harmful light. Alternately, the containers can be treated with a delustering agent in order to reflect and diffuse the harmful light at the surface and thus prevent its passage into the containers. To be sure, bottles have been coated in the art for aesthetic reasons. Also, bottles, particularly pressurized bottles, have been coated in order to strengthen them and, thus, guard against explosion and/or scattering of the exploded bottles.

Principally of interest here are containers that are surface treated with coatings that significantly reduce the effect of the harmful light on contents of transparent containers.

SUMMARY OF THE INVENTION

In accordance with the foregoing, the present invention encompasses a water-based thermosetting coating composition comprising a combination of a film former; a reactive metal-free colorant; an adhesion promoter, and an ultraviolet (UV) light absorber in an effective amount to form a transparent thermoset coating which substantially blocks transmission of product damaging light. By the term "water-based" herein is meant that water is the major diluent in the liquid coating composition. By the term "thermosetting" herein is meant that the coating composition undergoes an irreversible chemical transformation to form a film, particularly upon application of heat. By the term "reactive" (colorant) is meant that under normal service conditions encountered by a coated article of this invention, the colorant will not be removed from the cured film. By the term "substantially blocks" is meant that there is less than 3 percent of transmitted light. The term "product damaging light" or "harmful light" refers to light with the wavelengths of electromagnetic radiation in the visible and ultraviolet regions which can cause undesirable flavor and/or odor changes in the contents of transparent containers.

In the presently preferred embodiment, the invention comprises a water-based thermosetting coating composition comprising a film-former which is a hydroxy-functional acrylic resin in combination with a crosslinkable melamine resin, a reactive metal-free colorant which is a macromolecular chromophore-modified polymeric dye, a UV absorber which is 2,2',4,4'-tetrahydroxybenzophenone and an adhesion promoter which is gamma-glycidoxypropyltrimethoxysilane. The cured coating on a colorless glass bottle has been found to produce a film which is essentially opaque to UV and visible light in the region of about 525 to 300 nanometers (nm). It has been found that beverages, such as beer, contained in such a bottle are effectively protected against lightstruck flavor. Additionally, the coating composition of this invention can produce hard, glossy, pasteurizable coatings with excellent adhesion.

DETAILED DESCRIPTION OF THE INVENTION

As a film-former, there can be employed herein a thermosettable material selected from the group consisting of an acrylic polymer, a polyester, a polyether, an epoxy polymer, a polyurethane or a mixture thereof. Typically, the thermosettable material contains a crosslinking group such as an active hydrogen, e.g., a hydroxyl group. In accordance with this invention, the thermosettalbe material is conducive to the formation of a transparent water-based coating. By the term "transparent" is meant that the coating is free of noticeable haze upon visual examination. An illustrative example of the thermosettable material can be an acrylic polymer which is compatible with water and which can be prepared by free radical addition polymerization of ethylenically unsaturated monomers at least one of which contains a hydroxyl group. A specific but non-limiting example of the monomer containing a hydroxyl group can be hydroxyethyl acrylate or hydroxyethyl methacrylate. Other monomers useful herein can be methylmethacrylate, styrene, butyl acrylate, butyl methacrylate, N-ethoxymethyl acrylamide or N-butoxymethyl acrylamide and the like. The polymer can be made compatible with water by incorporating therein a hydrophilic group such as an acid group that can be neutralized with a base such as amine or ammonia. The acid group can be introduced into the polymer by copolymerizing therein an acid group containing a monomer such as acrylic acid or methacrylic acid.

An external or internal crosslinking agent is usually employed herein. An illustrative example of the crosslinking agent can be a substituted and unsubstituted melamine, benzoguanamine, urea, isocyanate or amides. A specific but non-limiting example of the crosslinking agents can be hexamethoxylmethyl melamines, partially methylated melamine formaldehyde resin, methylated ureas. Also, N-ethoxymethacrylamide or N-butoxymethacrylamide or the like can be copolymerized in the afore-described acrylic polymer in order to introduce an internal crosslinking agent into the polymer. The crosslinking agent is employed in an amount sufficient to provide an effectively cured coating. By "effectively cured coating" is meant that the coating is hard, has good tape adhesion and does not blush or haze upon exposure to water. Typically, the crosslinking agent is employed in an amount of about 5 to 50 percent and preferably about 10 to 35 percent based on resin solids.

As a colorant, there can be employed herein a reactive metal-free polymer which can be an active hydrogen-containing material such as a hydroxy-functional polymer which can be represented by the formula:

wherein R is a dyestuff radical, n is at least 15, x is from 1 to 6, and the product of n times x is at least 30, preferably between 50 and 200, more preferably between about 75 and 150.

Preferred amongst the compounds of the above formula are those wherein R is attached by an amino nitrogen. Compounds contemplated within this general class are those wherein R is a nitroso, nitro, azo, including monoazo, diazo and trisazo, diphenylmethane, triarylmethane, xanthene, anthraquinone dyestuff radical. Especially preferred are compounds represented by the formula:

$R-N[(CH_2CH_2O)_nH]_x$ wherein R-N is an organic dyestuff radical, x is from 1 to 2, and the product of n times x is between 30 and 200, preferably between 50 and 150. Included within this latter class are those wherein R is an azo or anthraquinone dyestuff radical.

The most readily prepared and widest class of colorants of this invention are those having, in addition to a polyethyleneoxy group, an azo dyestuff group, anthraquinone dyestuff group, and the like. Specific examples of the colorant can be found in U.S. Pat. No. 3,157,633, which is incorporated herein by reference. The colorant can be present in an amount of about 0.2 to 50 percent and preferably about 10 to 20 percent by weight based on resin solids.

As an ultraviolet light absorber, there can be employed herein the following illustrative but non-limiting examples. The ultraviolet light absorber can be substituted benzophenones such as 2-hydroxybenzophenone, 2-(2H-benzotriazol-2-yl)phenol, or 2,2′,4,4′-tetrahydroxybenzophenone which is preferred. The ultraviolet light absorber is typically present in an amount of about 0.5 to 5.0 percent and preferably about 1.5 to 4 percent by weight based on resin solids.

In the preparation of the coating composition, the afore-stated ingredients can be blended thoroughly in any order. Additional ingredients, typical among which is an adhesion promoter such as a silane coupling agent, e.g., gamma-methacryloxy-trimethoxysilane or gamma-glycoxypropyltrimethoxysilane, can be employed. The resultant coating composition can have viscosity of about 30 to 120 seconds, preferably about 50 to 90 seconds, as measured with a No. 2 Zahn cup, at 20 to 40 percent solids. Volatile organic content (VOC) of the coating can be about 1.2 to 4.5 pounds per gallon and preferably about 2.1 to 3.5 pounds per gallon.

In the practice of the invention, the coating composition can be employed in a process for reducing the degradation of the contents of a light-transmitting container due to the effect of visible and/or ultraviolet light; said process comprising coating the container with a thermosetting water-based coating composition comprising an effective combination of a film-former; a non-metallic, reactive colorant, an ultraviolet absorber and an adhesion promoter in an amount sufficient to form a transparent thermoset coating which substantially blocks transmission of product damaging light, particularly in the range of about 525 to 300 nm. The applied coating is usually cured by application of high temperature air to bring the temperature of the container substrate, such as glass, above 300° F. The resultant coating has a film weight of about 0.1 to 0.9 milligrams, and preferably about 0.2 to 0.7 milligrams, using a 12-ounce glass beverage bottle as a standard.

The light-transmitting container can be made of glass, plastic or the like, including pretreated containers. A container with the cured coating thereon can be essentially transparent and nonetheless effective in protecting contents such as beer from lightstruck flavor. Other beverages, cosmetics, medicines and food can be protected in a like manner against the lightstruck phenomenon.

This and other aspects of the invention are further illustrated by the following non-limiting examples.

EXAMPLE A

The following is an example of an acrylic polymer that is useful as a film former in the preparation of the coating composition of this invention. The acrylic polymer was prepared by free radical initiated addition polymerization using the following:

| Ingredients | Parts by Weight |
|---|---|
| Butyl Cellosolve | 777.7 |
| Butanol | 359.5 |
| Styrene | 107.2 |
| Methyl Methacrylate | 643.7 |
| Acrylic Acid | 257.5 |
| Butyl Acrylate | 922.6 |
| Hydroxyethyl Acrylate | 107.2 |
| Butyl Methacrylate | 107.2 |
| N-butoxymethyl acrylamide | 174.3 |
| Tertiary Dodecyl Mercaptan | 10.7 |
| T-butyl Perbenzoate | 37.7 |
| Dimethylethanolamine | 303.3 |
| Deionized Water | 2450.0 |
| "Shellmax" Wax[1] | 42.9 |
| Carnauba Wax | 42.9 |

[1]Available from Shell Chemical Co.

The resultant acrylic polymer having 37 percent solids was employed in the coating compositions of this invention as follows.

EXAMPLE 1

A coating composition of the invention which was essentially opaque to ultraviolet light in the region of 375 to 300 nm on a colorless glass bottle while possessing very little or no visible color was prepared as follows:

| Composition Ingredients | Percent Compositions |
|---|---|
| Acrylic resin of Example A | 57.2 |
| "Cymel 385"[1] | 38.5 |
| "A-187" Silane[2] | 1.9 |
| "Uvinul D-50"[3] | 2.4 |

[1]A melamine resin available from American Cyanamid.
[2]Gamma glycidoxypropyltrimethoxysilane from Union Carbide Co.
[3]2,2′,4,4′-tetrahydroxybenzophenone from BASF Co.

The above ingredients were blended in the above-listed order, diluted with deionized water to 35 percent solids and a VOC of 2.8 and spray applied to a 12-ounce flint glass bottle. The applied coating was cured thermally to a peak glass temperature of 300° F. to give a clear, hard and glossy film that was resistant to immersion in 170° F. water without hazing, blushing or loss of adhesion as measured by a cross hatch/tape test. A visible UV spectrum showed very little absorbence above 400 nm with complete opacity below 375 nm.

EXAMPLE 2

A coating composition of the invention which was essentially opaque to ultraviolet and visible light in the region of 525 to 300 nm on a colorless glass bottle thereby giving a lightstruck flavor protection equal to or greater than amber glass to light sensitive materials such as beer was prepared as follows.

| Ingredients | Percent Compositions |
| --- | --- |
| Acrylic resin of Example A | 50.2 |
| "Cymel 385" | 33.8 |
| "A-187" Silane | 1.7 |
| Uvinul D-50 | 2.1 |
| "Reactint Yellow X15"[1] | 2.5 |
| "Reactint Orange X38"[2] | 2.5 |
| "Reactint Blue X3LV"[3] | 1.7 |

[1] Polymeric metal-free colorant from Milliken Chemical.
[2] Polymeric metal-free colorant from Milliken Chemical.
[3] Polymeric metal-free colorant from Milliken Chemical.

The above ingredients were blended in the above-listed order, diluted with deionized water to 35 percent solids and a VOC of 2.8 pounds per gallon and spray applied to a 12-ounce colorless bottle. The applied coating was cured thermally to a peak glass temperature of 300° F. to give a hard, glossy film, dark brown in color and resistant to immersion in 170° F. water without hazing, blushing, loss of adhesion, or leaching of colorant into the water bath. A visible UV spectrum shows substantially complete absorbence from 525 to 300 nm.

EXAMPLE 3

This example further illustrates the preparation of an acrylic polymer that was employed in the preparation of a coating of this invention.

| Ingredients | Parts by Weight |
| --- | --- |
| Reactor Charge | |
| Butyl Cellosolve | 337.5 |
| Butanol | 125.0 |
| SHELLMAX wax | 25.0 |
| MEKON wax | 15.0 |
| Charge X | |
| Butyl Cellosolve | 37.5 |
| t-Butyl perbenzoate | 25.0 |
| Charge A | |
| N-butyoxymethyl methacrylamide | 325.2 |
| Acrylic acid | 120.0 |
| Butyl acrylate | 130.0 |
| Methyl methacrylate | 550.0 |
| Rinse | |
| Butanol | 10.0 |
| Charge B | |
| Butyl cellosolve | 2.5 |
| t-Butyl perbenzoate | 2.5 |
| Charge C | |
| Butyl cellosolve | 2.5 |
| t-Butyl perbenzoate | 2.5 |
| Charge D | |
| Dimethylethanolamine | 148.3 |
| Charge E | |
| Deionized Water | 200.7 |

A reaction vessel equipped with thermometer, stirrer, dropping funnels, reflux condenser and means for maintaining a blanket of nitrogen was charged at room temperature with a composition consisting of the reactor charge. The composition was heated over a period of about 40 minutes to reflux. When reflux temperature was attained, the simultaneous, gradual addition to the vessel of Charge A and Charge X was started and continued over three hours while maintaining reflux. When the addition of Charges A and X were completed and at 129° C., Charge B and the Rinse were added and the reaction mixture was held for 1.5 hours. Charge C was added at 128° C. and the reaction mixture was held for 1.5 hours. The reaction mixture was then cooled to 123° C. (resin solids was 29.0 percent). Feed D was injected into the reaction mixture over 15 minutes and held for 15 minutes. Feed E was added to the reaction mixture over 1.5 hours at 113° C. The resultant mixture was heat aged for 2 hours over 72° C. to 44° C. Analysis: Milliequivalents of acid was 0.436; milliequivalents of base was 0.440, weight average molecular weight was 17,403, viscosity was 435 centipoises (Brookfield No. 3 spindle) at 20 RPM, pH was 8.08 and solid of 28.7 percent (measured at 110° C. for 2 hours).

EXAMPLE 4

A coating composition of the invention which was essentially opaque to ultraviolet and visible light in the region of 525 to 300 nm on a colorless glass bottle thereby giving a lightstruck flavor protection equal to or greater than amber glass to light-sensitive materials such as beer was prepared as follows:

| Ingredients | Percent Compositions | Resin Solids |
| --- | --- | --- |
| The above acrylic resin | 140.4 | 40 |
| "A-187" Silane | 0.8 | 0.8 |
| "Reactint Yellow X15" | 5.0 | 5.0 |
| "Reactint Orange X38" | 4.2 | 4.2 |
| "Reactint Blue X3LV" | 1.0 | 1.0 |
| "Univul D-50" | 10.0 | 2.0 |
| L-7500 Silicone Fluid[1] | 0.1 | 0.1 |

[1] Available from Union Carbide.

The above ingredients were blended in the above-listed order, diluted with deionized water to 26.7 percent solids and spray applied to a 12-ounce clear bottle. The applied coating was cured thermally to a peak glass temperature of 340° F. to give a hard, glossy film, dark brown in color and resistant to immersion in 180° F. water for 10 minutes without hazing, blushing, loss of adhesion, or leaching of colorant into the water. A visible UV spectrum shows substantially complete absorbence from 525 to 300 nm.

While the illustrative embodiments of the invention have been described hereinabove, it will be understood that various modifications will be apparent to and can be made by those skilled in the art without departing from the scope or spirit of the invention. Accordingly, it is intended that the claims directed to the invention be construed as encompassing all aspects of the invention which would be treated as equivalents by those skilled in the art to which the invention pertains.

Therefore, what is claimed is:

1. A water-based thermosetting coating composition comprising: (i) a film-former including a resin and an internal or external crosslinking agent; (ii) a metal-free colorant polymeric dye which is reactive with the film-former; (iii) and an ultraviolet light absorber in an effective combination to form a transparent thermoset coating which substantially blocks transmission of product damaging light.

2. The water-based thermosetting coating composition of claim 1 wherein the film-former is selected from the group consisting of an acrylic polymer, a polyester, a polyether, an epoxy polymer, a polyurethane, an aminoplast, a phenoplast or a mixture thereof.

3. The water-based thermosetting coating composition of claim 1 wherein the colorant is a hydroxy-functional macromolecular chromophore-modified polymeric dye.

4. The water-based thermosetting coating composition of claim 1 wherein the colorant is present in an amount of about 0.2 to 50 percent by weight based on resin solids.

5. The water-based thermosetting coating composition of claim 1 wherein the ultraviolet light absorber is a hydroxy-functional material which is a 2-hydroxybenzophenone or a 2-(2H-benzotriazol-2-yl)phenol.

6. The water-based thermosetting coating composition of claim 5 wherein the ultraviolet light absorber is 2,2′,4,4′-tetrahydroxybenzophenone.

7. The water-based thermosetting coating composition of claim 1 wherein the ultraviolet light absorber is present in an amount of about 0.5 to 5.0 percent by weight based on solids.

8. The water-based thermosetting coating composition of claim 1 wherein the ultraviolet light absorber is present in an amount of about 0.5 to 2 percent by weight solids.

9. A process for reducing the degradation of the contents of a light-transmitting container due to the effect of visible and/or ultraviolet light; said process comprising coating the container with a thermosetting water-based coating composition comprising a film-former including a resin and an internal or external crosslinking agent, a metal-free colorant including a polymeric dye which is reactive with a film-former and an ultraviolet light absorber in an effective combination to form a coating which substantially blocks transmission of product damaging light.

10. An article of matter comprising a substrate to which is applied the water-based thermosetting coating composition of claim 1.

11. An article of matter of claim 10 wherein the coating composition is applied at a film thickness of about 0.05 to 0.3 mils or higher.

12. An article of matter of claim 10 wherein the substrate is glass or plastic.

13. An article of matter of claim 11 which is in the form of a bottle.

14. The water-based thermosetting coating composition of claim 1 further including an adhesion promoter.

* * * * *